United States Patent [19]

Hummer

[11] Patent Number: 4,467,934

[45] Date of Patent: Aug. 28, 1984

[54] RECEPTACLE FOR HOLDING PLURAL SIZE CONTAINERS

[75] Inventor: Gilbert C. Hummer, Cranford, N.J.

[73] Assignee: Deka Plastics, Inc., Elizabeth, N.J.

[21] Appl. No.: 467,936

[22] Filed: Feb. 18, 1983

[51] Int. Cl.³ ............................................. B65D 25/28
[52] U.S. Cl. ..................... 220/85 H; 294/33; D7/70; 224/42.46 R
[58] Field of Search ............ 220/85 H, 94 R, 96; 224/42.46 R, 42.42 R, 42.45 R, 311; 229/52 A, 52 AW, 52 AM; D7/70

[56] References Cited

U.S. PATENT DOCUMENTS

| D. 214,934 | 8/1969 | Pitts ............................. D7/70 X |
| D. 226,623 | 4/1973 | Shuford ......................... D7/70 |
| 1,530,256 | 3/1925 | Garland ......................... 220/85 H |
| 2,215,411 | 9/1940 | Sebring ......................... 294/33 X |

*Primary Examiner*—Steven M. Pollard
*Attorney, Agent, or Firm*—George J. Brandt, Jr.

[57] ABSTRACT

A thermoplastic, one-piece, open frame receptacle for holding beverage containers of plural sizes, and provided with a user handle and a mounting bracket for hanging the receptacle from a supporting surface such as an automobile door.

8 Claims, 7 Drawing Figures

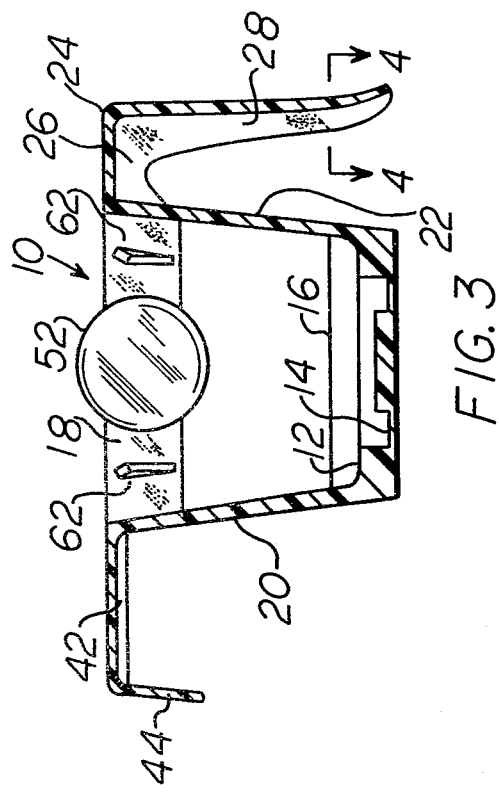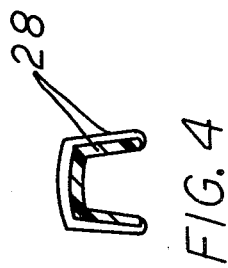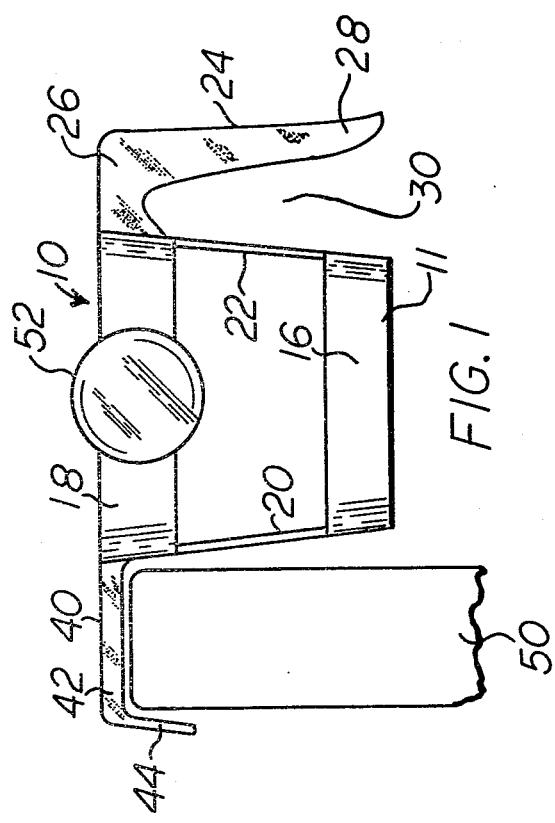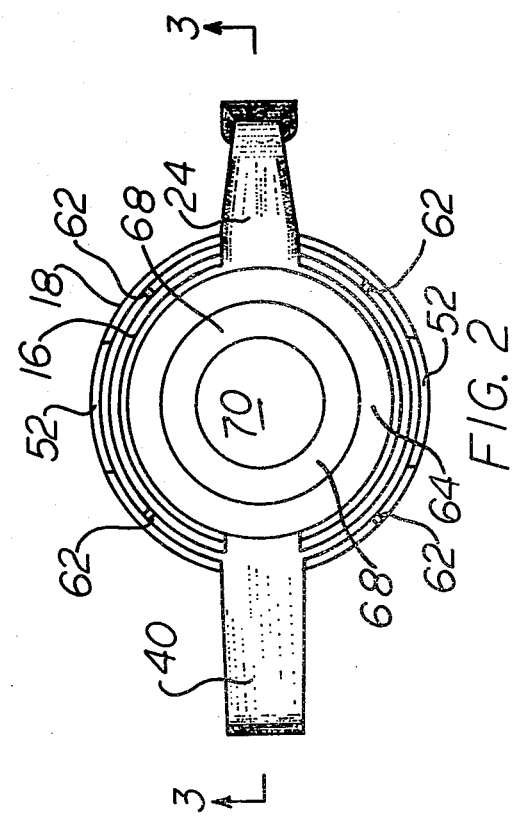

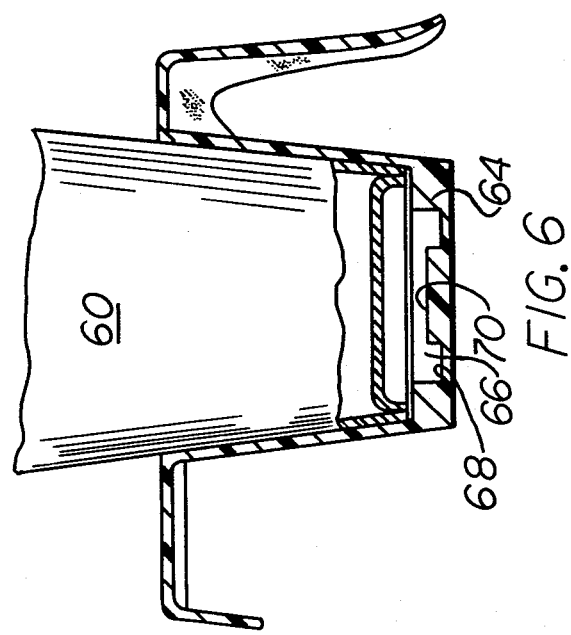
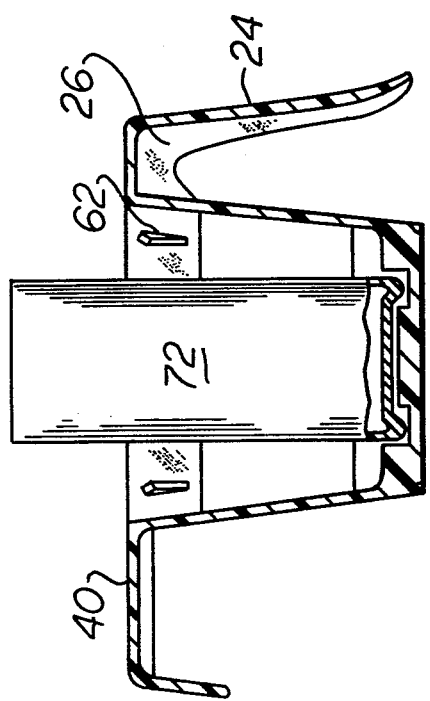
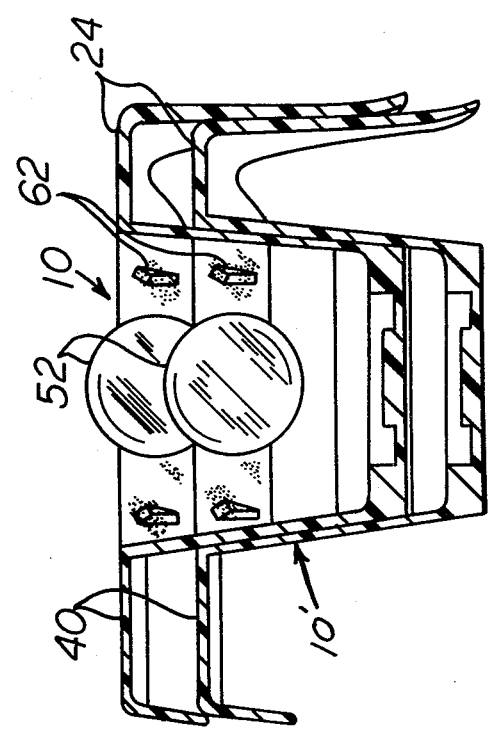

RECEPTACLE FOR HOLDING PLURAL SIZE CONTAINERS

BACKGROUND OF THE INVENTION

Receptacles for holding paper cups and the like have been known and used for many years. An advantageous employment of such receptacles is in connection with beverage sales at fast food establishments which commonly dispense soda pop, milk and similar beverages to the users in a paper or plastic throwaway container. Such containers are fully adequate for the intended use where a customer remains in the establishment to consume food purchased. However, where as is oftentimes the case, the user leaves the establishment to consume the food and drink the beverage in his or her automobile it can be a problem for the consumer to conveniently set the beverage container down in secure fashion in the automobile since vehicular space receptive of the container is at best limited. Another difficulty is that certain fast food establishments have introduced sale of soda pop in large unit quantity, e.g., in 32 ounce size. The cup container for holding that quantity is quite large and for many people grasped only with difficulty since it is in the mid-body region of a diameter in excess of 4 inches. Therefore use of a receptacle with such size containers is almost a must. Further, such receptacle cannot easily be of throwaway character because a receptacle to hold such size container and support the weight of 32 ounces of liquid has to have a durable construction and be useable indefinitely. Such type of receptacle cannot readily be given away by a fast-food establishment because of the factor of cost of manufacture. At the same time, the cost should be not so great that the consumer be deterred from wanting to purchase one at a reasonable price. Therefore, the receptacle should be of simple construction, relatively inexpensive manufacture, and embody the feature that it easily can be used in an automobile by hanging it from a vehicle supporting surface so that the user can with facility have access to the beverage container.

SUMMARY OF THE INVENTION

The present invention relates to a receptacle for retention therein of a beverage container such as a paper cup, a plastic cup, a metallic beverage can and the like and which receptacle has convenient handle means for the user to hold same as well as a feature of being readily mountable to a variety of supporting surfaces in hung position to allow the user to set the beverage container down in a secure, convenient, and trouble free disposition while using his or her hands in connection with eating foods when situate in an automobile.

The receptacle of the present invention preferably is made as a lightweight, one-piece, thermoplastic formed structure and is further characterized by being designed to be nestable, telescopically with like ones of such receptacles for handy shipment to and storage at fast-food outlets.

In accordance with the present invention, the receptacle includes a frame of open deep bowl-like form and comprising a base member having a pair of support levels associated with reception of different sized containers, one of said levels being associated with support of a large size (e.g., 32 ounce) paper or plastic cup and a second level associated with support of a standard size 12 ounce beverage can or smaller paper or plastic cup. A skirt piece encircles the base member and extends upwardly a distance from the base. A second larger diameter encircling skirt is spaced a distance above the first skirt and is supported from it by a pair of widened, relatively thin but rigid connector pieces located in diametrically opposed positioning in the frame. The joined together frame structure, that is, the skirts, connector pieces and base member are of tapered profile, tapering from the top to the bottom to allow ready nesting of one receptacle in a like receptacle for producing a compact stack of a plurality of such receptacles.

A handle for user grasping and holding of the receptacle is attached to the frame and has a first part extending radially outwardly from the top skirt proximate the joinder location of one of said connector pieces with the top skirt. A second part extends downwardly from the first part and follows a laterally widening course away from the frame, and the said one connector piece in particular, to provide space therebetween for the clenched fingers of the user's hand when grasping the receptacle. The handle is made in the form of a relatively deep channel member opening toward the frame to provide thereby a rigid, strengthened handle member capable of supporting the substantial weight of 32 ounces of liquid without hazard of flexure in a handle of otherwise thin and lightweight construction. The handle second part also flares widthwise from the top to bottom to facilitate the reception of the handle of one receptacle in telescoping fashion over that of another below in a stacked plurality.

A mounting bracket component can be attached to the frame at the side thereof opposite the location of the handle and has a relatively narrow, elongate part directed radially outwardly from the top skirt and a generally vertically downwardly directed part extending a distance below the bottom of the top skirt to provide a bracket depth of appreciable measure to enhance the mounting security with which said bracket can be received over a supporting surface. One such supporting surface could, for example, be the door of an automobile, the window being lowered by the user as a preliminary to mounting the bracket thereon.

The receptacle preferably is made of one-piece construction using suitable thermoplastic molding techniques. The construction of the receptacle is such as to lend for producing a very attractive appearing, yet highly functional device.

The advantageous and further features of the invention will be made more apparent from the following detailed description to be given hereinafter and will be described in terms of such features of construction, combination of elements and arrangement of parts as will be exemplified in the construction set forth and the scope of the invention will be invalidated in the claims.

BRIEF DESCRIPTION OF THE DRAWINGS

The invention will appear more clearly from the following detailed description when taken in conjunction with the accompanying drawings in which:

FIG. 1 is a side elevational view of a receptacle constructed in accordance with the principles of the present invention, the receptacle being shown mounted on a supporting surface.

FIG. 2 is a top plan view of FIG. 1.

FIG. 3 is a sectional view taken along the line 3—3 in FIG. 2.

FIG. 4 is a sectional view taken along the line 4—4 in FIG. 3.

FIG. 5 is a vertical central sectional view showing the manner in which the receptacle of the inventor can be rested in a like receptacle.

FIGS. 6 and 7 show, respectively, the reception of a large (32 ounce) cup container, and a metallic 12 ounce can in the receptacle.

Throughout the following description, like reference numerals are used to denote like parts in the drawings.

DESCRIPTION OF THE PREFERRED EMBODIMENT

Referring to FIGS. 1-3, the receptacle 10 is intended for use reception of standard size 12 ounce containers, but also and more particularly for reception of large containers holding larger, more weighty liquid quantities. The receptacle itself is lightweight, decorative and possesses a large open body to enhance visual focus on a container received therein. The receptacle includes the relatively open, bowl-shaped frame depicted, which frame has a base 11 and as best seen in FIG. 3 a support level 12 and a support level 14 associated, respectively, with support of a large size cup, and support of small size cup and can containers. A lower frame skirt 16 encircles the base 11 and extends upwardly a short distance therefrom. An upper encircling skirt member 18 of larger diameter than skirt 16, is located at the top of the frame and is joined at opposite diametrical locations to skirt 16 by a pair of relatively thin but rigid connector pieces 20,22 the overall profile of the frame thus being that of a tapered bowl facilitating nesting thereof in the frame of a like receptacle. It will be seen then that the inner and outer surfaces of the skirt member and connector pieces and the outer surface of the base follow the requisite tapered courses to provide nestability.

A user handle 24 is attached to the frame and includes a first handle portion 26 extending radially outwardly from skirt 18 proximate the location where connector piece 22 joins or merges with such skirt. The handle has a second downwardly directed portion 28 which laterally widens away from the frame to provide space 30 for the accomodation of the user's fingers when holding the receptacle. Since the receptacle is intended for holding a container with up to 2 pounds of liquid therein, the handle should be a rigid structure component and also impart strengthening rigidity to skirt 18. For such purpose, the handle is made, as depicted in FIG. 4, with a channel cross section opening in the direction of the frame. The handle 24 allows the user to grasp the receptacle with comfort and ease and with facility to lift the receptacle and container received therein when drinking from the container. Handle 24 also is constructed with the downwardly directed portion 28 being of flaring character, i.e., it flares in a widening width from top to bottom to allow for the telescoping of the handle of a receptacle over that of a receptacle next below and with which it is nested. The manner of nesting one receptacle 10 in another 10' is seen by reference to FIG. 5.

The receptacle 10 further embodies the feature of being readily mounted in hung position from a variety of supporting surfaces. For such purpose, the frame is provided with a mounting bracket 40, preferably located at the side opposite from handle 24, the mounting bracket having an elongated, relatively narrow first part 42 extending radially away from the frame and transiting downwardly with a second part thereof 44 that extends down at least below the bottom of skirt 18 to therewith provide an appreciable bracket depth for securing the receptacle to a supporting surface, e.g., the automobile door 50 shown in FIG. 1. Support bracket part 42 is desirably of channel cross section and bracket part 44 is tapered in the outward direction to allow nesting of the bracket with the like part of a receptacle arranged below in stacked configuration.

The receptacle 10 with its open frame structure has an attractive, clean appearance. The appearance further can be enhanced by providing one or more enlarged bosses 52 on upper skirt member 18, the depicted bosses 52 being of circular profile and providing space from reception of indicia such as a fast-food logo etc.

As noted above, the receptacle 10 is adapted to hold containers of different sizes and as can be understood readily with reference to FIGS. 6 and 7. In the FIG. 6 depiction, a larger paper or plastic cup 60 of about 32 ounce capacity has been received in the frame. In such instance, the cup 60 snuggly fills the encircled space of the frame and abuts with lugs 62 carried at the inner surface of skirt 18 which lugs are disposed at circularly spaced locations on the skirt and function to stay the container within the frame. The container sits on the relatively thickened annular segment 64 of frame base 11, the base having a depressed central part 66 which includes an annular groove 68 and a circular region part 70. The depressed central part 66 serves as the support for a smaller sized container of, e.g., 12 ounce capacity as shown in FIG. 7, wherein the depicted container 72 is a metallic beverage can and the lower chime wall thereof is received in annular groove 68.

While there is above disclosed but one embodiment of the receptacle, it will be appreciated that certain variations and modifications therein can be produced without departing from the scope of the inventive concept disclosed.

What is claimed is:

1. A receptacle for retention therein of a paper cup, plastic container, beverage can or the like and conformably nestable in a like receptacle for ready storage of such receptacle in a plural stack thereof, said receptacle being characterized further by convenient user hand holding and the mountability of same in hung position on a variety of supporting surfaces, said receptacle including a frame comprising
    a base member having a pair of support levels, the first of said levels associated with support of a large size paper cup container and the second associated with support of a beverage can,
    a skirt piece encircling said base member and upstanding a distance therefrom,
    a second encircling skirt piece of relatively larger diametrical expanse spaced a distance above the first skirt piece, and
    a pair of oppositively located connector pieces supporting said second skirt piece from said first skirt piece, both said skirt pieces tapering inwardly from their respective tops to bottoms whereby said frame telescopically can be received nestably in the frame of a like receptacle, and
    a handle attached to said frame and including a first portion extending radially outwardly from said second skirt piece proximate the joinder location of one of said connector pieces with said second skirt piece, and a second downwardly depending portion laterally widening away a distance from said one connector piece to provide space therebetween receptive of a user's fingers when holding the receptacle, the handle being of relatively deep channel cross section opening toward said frame to provide enhanced handle rigidity.

2. The receptacle of claim 1 in which the channel section of the handle second portion flares from top to bottom to facilitate reception of said second portion over the like portion of the handle of a like receptacle with which it is nested.

3. The receptacle of claim 1 in which said base member has a relatively vertically thickened annular part encircling a depressed central area, the annular part defining the support surface for a paper cup received in said frame, the depressed central part defining the support surface for a beverage can.

4. The receptacle of claim 3 in which said depressed central area includes a circular central region and a lower outer annular region, said central region being adapted to nest up into the recessed bottom head of a beverage can, the outer annulus region providing support of the beverage can lower chime edge.

5. The receptacle of claim 1 further comprising a mounting bracket carried on said frame at the side opposite said handle, said mounting bracket having a relatively narrow, elongate part directed radially outwardly from said second skirt part and a generally vertically downwardly directed part extending a distance at least below the level of the bottom of said second skirt part to provide a bracket depth of appreciable measure to enhance the mounting security with which said bracket can be received over a supporting surface.

6. The receptacle of claim 1 in which said second skirt portion has vertically enlarged parts at opposite sides thereof and disposed circularly intermediate the location of said connector pieces to serve as indicia receptive areas on said frame.

7. The receptacle of claim 1 in which the inside surface of said second skirt member carries circularly spaced lugs thereon serving as paper cup container stay means when said container is received in said frame.

8. A receptacle for retention therein of a paper cup, plastic container, beverage can or the like and conformably nestable in a like receptacle for ready storage of such receptacle in a plural stack thereof, said receptacle being characterized further by convenient user hand holding and mountability of same in a hung position on a variety of supporting surfaces, said receptacle comprising as a single-piece thermoplastic molded structure, an open bowl-shaped frame having a base, a skirt encircling the base and extending a distance upward therefrom, a second skirt positioned above the first and joined thereto by connector pieces at diametrically opposed locations of said skirt members, a channel cross-section handle at one side of said frame extending radially from said second skirt for a distance and turning downwardly toward said base in laterally widening general alignment with one of said connector pieces to define a finger accomodity space between said one connector piece and said handle, and a mounting bracket extending radially from said second skirt for a distance and turning downwardly for a distance to a location at least below said second skirt and defining a mounting component of appreciable depth for engagement over a supporting surface, said bowl-shaped frame, handle and mounting bracket being of tapered profile to allow nesting of said receptacle within a like receptacle, said frame base having a first base level receptive of the bottom of a container of certain size, and said first base level encircling a lower second base level receptive of the bottom of a certain smaller size container.

* * * * *